(12) United States Patent
Zhu et al.

(10) Patent No.: US 10,665,946 B2
(45) Date of Patent: May 26, 2020

(54) ANTENNA AND COMMUNICATIONS DEVICE

(71) Applicant: Huawei Technologies Co., Ltd., Shenzhen (CN)

(72) Inventors: Maomao Zhu, Suzhou (CN); Bo Yuan, Suzhou (CN); Rui Hua, Suzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/998,675

(22) Filed: Aug. 16, 2018

(65) Prior Publication Data

US 2019/0058254 A1 Feb. 21, 2019

(30) Foreign Application Priority Data

Aug. 16, 2017 (CN) .......................... 2017 1 0701968

(51) Int. Cl.
*H01Q 19/00* (2006.01)
*H01Q 9/04* (2006.01)
(Continued)

(52) U.S. Cl.
CPC ............ *H01Q 9/045* (2013.01); *H01Q 1/22* (2013.01); *H01Q 3/242* (2013.01); *H01Q 3/446* (2013.01);
(Continued)

(58) Field of Classification Search
CPC .......... H01Q 9/045; H01Q 1/22; H01Q 19/10; H01Q 21/0006; H01Q 21/293;
(Continued)

(56) References Cited

U.S. PATENT DOCUMENTS 6,337,668 B1 * 1/2002 Ito .......................... H01Q 3/24
343/833
2002/0132581 A1 9/2002 Ichihara
(Continued)

FOREIGN PATENT DOCUMENTS

CN 1167171 C 9/2004
CN 104051850 A 9/2014
(Continued)

OTHER PUBLICATIONS

Machine Translation and Abstract of Japanese Publication No. JP2009094696, Apr. 30, 2009, 29 pages.
(Continued)

*Primary Examiner* — Dieu Hien T Duong
(74) *Attorney, Agent, or Firm* — Conley Rose, P.C.

(57) ABSTRACT

An antenna includes a feeding element and at least one non-feeding element. A vertical distance between each non-feeding element and the feeding element falls within a specified threshold, each non-feeding element includes a first conductor that is grounded, a regulator circuit, and a control switch disposed on the first conductor and configured to control the regulator circuit, where the regulator circuit is configured to regulate a current path length of the non-feeding element. The non-feeding element forms a reflector when the regulator circuit is enabled, or the non-feeding element forms a director when the regulator circuit is disabled. A design in which the reflector and the director are compatible is used such that a combination of one feeding element, M directors and N reflectors is implemented for the antenna to achieve a high directive gain and interference suppression capability.

20 Claims, 5 Drawing Sheets

(51) Int. Cl.

| | |
|---|---|
| *H01Q 19/28* | (2006.01) |
| *H01Q 3/24* | (2006.01) |
| *H01Q 19/32* | (2006.01) |
| *H01Q 19/30* | (2006.01) |
| *H01Q 3/44* | (2006.01) |
| *H01Q 21/29* | (2006.01) |
| *H01Q 1/22* | (2006.01) |
| *H01Q 19/10* | (2006.01) |
| *H01Q 21/00* | (2006.01) |
| *H04B 7/155* | (2006.01) |

(52) U.S. Cl.
CPC ............. *H01Q 19/10* (2013.01); *H01Q 19/28* (2013.01); *H01Q 19/30* (2013.01); *H01Q 19/32* (2013.01); *H01Q 21/0006* (2013.01); *H01Q 21/293* (2013.01); *H04B 7/15585* (2013.01)

(58) Field of Classification Search
CPC ........ H01Q 3/446; H01Q 19/30; H01Q 19/32; H01Q 3/242; H01Q 19/28; H01Q 19/00
See application file for complete search history.

(56) References Cited

U.S. PATENT DOCUMENTS

| | | | |
|---|---|---|---|
| 2011/0080325 A1 | 4/2011 | Livneh et al. | |
| 2014/0285391 A1 | 9/2014 | Baron et al. | |

FOREIGN PATENT DOCUMENTS

| | | |
|---|---|---|
| EP | 1035614 A2 | 9/2000 |
| JP | S50117343 A | 9/1975 |
| JP | 2001036337 A | 2/2001 |
| JP | 2001345633 A | 12/2001 |
| JP | 2009094696 A | 4/2009 |
| WO | 2014140791 A1 | 9/2014 |

OTHER PUBLICATIONS

Nakane, Y., et al., "Basic Studies on Aperture for Adaptive Antenna with Switched Loads of Parasitic Elements," XP001228651, Electronics and Communications in Japan, Part 1, vol. 88, No. 9, Jan. 2005, pp. 19-26.

Foreign Communication From a Counterpart Application, European Application No. 18188615.1, Extended European Search Report dated Jan. 7, 2019, 9 pages.

Machine Translation and Abstract of Japanese Publication No. JP2001036337, Feb. 9, 2001, 29 pages.

Machine Translation and Abstract of Japanese Publication No. JP2001345633, Dec. 14, 2001, 25 pages.

Machine Translation and Abstract of Japanese Publication No. JPS50117343, Sep. 13, 1975, 7 pages.

Foreign Communication From a Counterpart Application, Japanese Application No. 2018-152878, Japanese Office Action dated Aug. 5, 2019, 3 pages.

Foreign Communication From a Counterpart Application, Japanese Application No. 2018-152878, English Translation of Japanese Office Action dated Aug. 5, 2019, 4 pages.

Foreign Communication From a Counterpart Application, Chinese Application No. 201710701968.0, Chinese Office Action dated Jul. 29, 2019, 7 pages.

\* cited by examiner

ANTENNA AND COMMUNICATIONS DEVICE

CROSS-REFERENCE TO RELATED APPLICATION

This application claims priority to Chinese Patent Application No. 201710701968.0 filed on Aug. 16, 2017, which is hereby incorporated by reference in its entirety.

TECHNICAL FIELD

This application relates to the field of information technologies, and in particular, to an antenna and a communications device.

BACKGROUND

A wireless local area network (WLAN) is widely applied to homes, offices, and other indoor/outdoor environments. However, in indoor environments such as homes and offices, a horizontal coverage area and through-wall performance of an installed WLAN communications device, for example, an access point (also referred to as a hotspot) are important indicators that affect performance of a WLAN. Therefore, an adaptive switched-beam smart antenna with a high directive gain becomes extremely important in the WLAN communications device.

The following methods are available for implementing a smart antenna.

1. Different antennas or antenna arrays are selected using a radio frequency switch to perform radiation. Radiation directions of the antennas or antenna arrays are different, thereby implementing switching of antenna beams of a system.

2. An element and a feeding network are connected using a control switch, and different elements are selected by turning the control switch on or off, to perform radiation. Radiation directions of different elements are different, thereby implementing beam switching.

3. Reflectors in different directions are selected and connected using a control switch, thereby implementing beam switching.

However, these solutions have problems that a directive gain of an antenna is improved slightly relative to an omnidirectional gain, built-in and integration of an antenna array are difficult due to a large size, or the like.

SUMMARY

This application provides an antenna and a communications device in order to improve a communication effect of a WLAN communications device.

According to a first aspect, an antenna is provided, where the antenna includes a feeding element and at least one non-feeding element, where a vertical distance between each non-feeding element and the feeding element falls within a specified threshold, each non-feeding element includes a first conductor that is grounded, a regulator circuit, and a control switch that is disposed on the first conductor and that is configured to control the regulator circuit, where the regulator circuit is configured to regulate a current path length of the non-feeding element, and when the control switch is turned off, a current flows through the first conductor and the regulator circuit, and the current path length of the non-feeding element is greater than a resonance length of the feeding element, or when the control switch is turned on, a current flows through the first conductor and the control switch, and the current path length of the non-feeding element is less than a resonance length of the feeding element.

In the foregoing technical solution, the current path length of the non-feeding element and the distance between the non-feeding element and the feeding element are controlled such that the non-feeding element forms a reflector when the control switch is turned off and the regulator circuit is enabled, or the non-feeding element forms a director when the control switch is turned on and the regulator circuit is disabled. A design in which the reflector and the director are compatible is used such that a combination of one feeding element, M directors and N reflectors is implemented for the antenna, to achieve a high directive gain and interference suppression capability (where M+N>=1, and M+N=quantity of non-feeding elements). In addition, when the reflector and the director are switched, antenna beam switching can be rapidly completed, featuring easy implementation and a small size.

In a specific implementation solution, the first conductor includes a first sub-conductor and a second sub-conductor, two ends of the control switch are respectively connected to the first sub-conductor and the second sub-conductor, the regulator circuit includes a second conductor, and two ends of the second conductor are respectively connected to the first sub-conductor and the second sub-conductor, and the first sub-conductor communicates with the second sub-conductor through the control switch when the control switch is turned on, or the first sub-conductor communicates with the second sub-conductor through the second conductor when the control switch is turned off. The current path length of the non-feeding element is changed using the second conductor. The second conductor is a segment of metal conductor. When the second conductor is added into the first conductor, an increased current path length is a length of the second conductor. Moreover, a shape of the second conductor is not restricted. Either a straight-line shape or an arc shape or another shape may be used. The current path length added to the first conductor is affected only by the length of the second conductor. The first sub-conductor and the second sub-conductor are also segments of metal conductors. Shapes thereof are not limited, and different lengths may be used. For example, in a specific implementation solution, the second conductor is a U-shaped bending structure.

In a specific implementation solution, the current path length of the non-feeding element is greater than λ/4 and is greater than the resonance length of the feeding element when the control switch is turned on, or the current path length of the non-feeding element is less than λ/4 and is less than the resonance length of the feeding element when the control switch is turned off, where λ is a medium wavelength of the feeding element.

In a specific implementation solution, the two ends of the control switch are separately provided with a connection point, one end of the first sub-conductor and one end of the second conductor are fastened to a connection point at one end of the control switch, and one end of the second sub-conductor and the other end of the second conductor are fastened to a connection point at the other end of the control switch. This facilitates connection of the second conductor and also ensures that a current path length through which the current flows may be equivalent to lengths of the first conductor and the second conductor. Therefore, an entire current path length may be directly defined according to the lengths of the first conductor and the second conductor.

In a specific implementation solution, a matched network is set on the second conductor. A current path length added to the first conductor by the second conductor is regulated using the matched network that is set.

In a specific implementation solution, the matched network is an inductor, or a capacitor and an inductor that are connected in series. In actual use, different current path lengths may be selected and used according to different requirements.

In a specific implementation solution, the specified threshold is 0.2λ-0.25λ, where λ is the medium wavelength of the feeding element. In specific setting, the distance from the non-feeding element to the feeding element may use different distances such as 0.2λ, 0.21λ, 0.22λ, 0.23λ, 0.24λ, or 0.25λ.

In a specific implementation solution, when the regulator circuit is disabled, the current path length of the non-feeding element falls within 0.21λ-0.24λ. That is, when the regulator circuit is disabled, the current path length of the non-feeding element may be different, for example, 0.21λ, 0.22λ, 0.23λ, or 0.24λ. When the regulator circuit is enabled, the current path length of the non-feeding element falls within 0.26λ-0.28λ, where λ is the medium wavelength of the feeding element. That is, when the regulator circuit is enabled, the current path length of the non-feeding element may be different, for example, 0.26λ, 0.27λ, or 0.28λ.

In a specific implementation solution, a quantity of the non-feeding element is four, and the four non-feeding elements are arranged surrounding the feeding element. Different quantities of reflectors and directors are formed by enabling and disabling the regulator circuits on the four non-feeding elements, thereby improving the directive gain and the interference suppression capability.

In a specific implementation solution, the four non-feeding elements form a ring shape and are evenly disposed.

According to a second aspect, a communications device is provided, where the communications device includes the antenna according to any one of the foregoing implementations.

In the foregoing technical solutions, a current path length of a non-feeding element and a distance between the non-feeding element and a feeding element are controlled such that the non-feeding element forms a reflector when a regulator circuit is enabled, or the non-feeding element forms a director when the regulator circuit is disabled. A design in which the reflector and the director are compatible is used such that a combination of one feeding element, M directors and N reflectors is implemented for the antenna to achieve a high directive gain and interference suppression capability (where M+N>=1, and M+N=quantity of non-feeding elements). In addition, when the reflector and the director are switched, antenna beam switching can be rapidly completed, featuring easy implementation and a small size.

DESCRIPTION OF EMBODIMENTS

To make the objectives, technical solutions, and advantages of this application clearer, the following further describes this application in detail with reference to the accompanying drawings.

Figure 1:
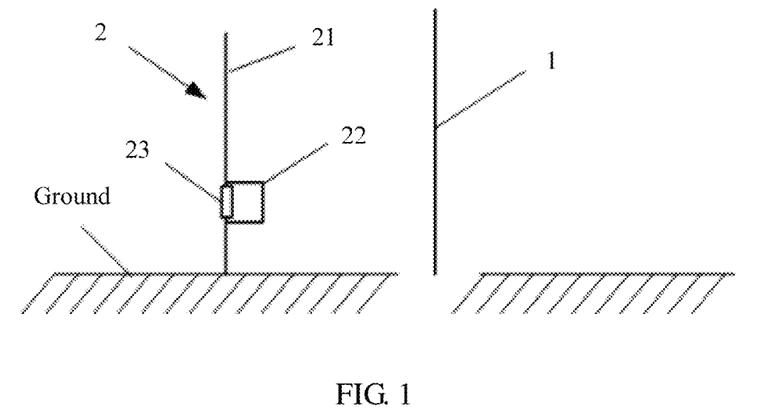
FIG. 1 is a schematic structural diagram of an antenna according to this application.

As shown in FIG. 1, an embodiment of this application provides an antenna. The antenna includes a feeding element 1 and at least one non-feeding element 2. A vertical distance between each non-feeding element 2 and the feeding element 1 falls within a specified threshold, each non-feeding element 2 includes a first conductor 21 that is grounded, a regulator circuit 22, and a control switch 23 that is disposed on the first conductor 21 and that is configured to control the regulator circuit 22, where the regulator circuit 22 is configured to regulate a current path length of the non-feeding element 2.

When the control switch 23 is turned off, a current flows through the first conductor 21 and the regulator circuit 22, and the current path length of the non-feeding element 2 is greater than a resonance length of the feeding element 1, or when the control switch 23 is turned on, a current flows through the first conductor 21 and the control switch 23, and the current path length of the non-feeding element 2 is less than a resonance length of the feeding element 1.

The feeding element 1 may be antennas of different types, for example, an element antenna or a planar inverted F antenna (PIFA).

In the foregoing solution, functions of a reflector and a director are implemented using the non-feeding element 2. When the non-feeding element 2 switches between two component working modes, the regulator circuit 22 is used to perform control. When the regulator circuit 22 is connected to the first conductor 21, an overall current path length of the first conductor 21 is increased. In this case, the non-feeding element 2 functions as a reflector. When the regulator circuit 22 is not connected to the first conductor 21, a current path length of the first conductor 21 is less than the resonance length of the feeding element 1. In this case, the non-feeding element 2 functions as a director. The following describes in detail a working principle of the non-feeding element 2.

The non-feeding element 2 in FIG. 1 is grounded, and the feeding element 1 is in the middle of FIG. 1. A vertical distance between the non-feeding element 2 and the feeding element 1 falls within the specified threshold. The specified threshold is 0.2λ-0.25λ, where λ is a medium wavelength of the feeding element 1. In specific setting, the distance from the non-feeding element 2 to the feeding element 1 may use different distances such as 0.2λ, 0.21λ, 0.22λ, 0.23λ, 0.24λ, or 0.25λ, provided that the distance between the non-feeding element 2 to the feeding element 1 falls within 0.2λ-0.25λ, where λ is the medium wavelength of the feeding element 1, and the resonance length of the feeding element 1 is approximately one-fourth the wavelength (that is, λ/4). In specific use, when the current path length of the non-feeding element 2 is slightly longer than the resonance length, the non-feeding element 2 is inductive, and a current lags 90° behind a voltage. A 90° phase difference caused by a path difference between the feeding element 1 and the non-feeding element 2 and a phase difference caused because the non-feeding element 2 is inductive are offset, where the path difference is caused because the non-feeding element 2 points at a direction of the feeding element 1. Therefore, radiation fields of the non-feeding element 2 and the feeding element 1 in this direction are superposed and enhanced. Similarly, for an opposite direction, the 90° phase difference caused by the path difference between the feeding element 1 and the non-feeding element 2 and the phase difference caused because the non-feeding element 2 is inductive are superposed to 180°. Therefore, radiation fields of the non-feeding element 2 and the feeding element 1 in this direction are offset, with an electric field in one direction enhanced and an electric field in one direction weakened, thereby forming a directive beam. In this way, the non-feeding element 2 exerts a reflex action on the beam, and is a reflector.

When the current path length of the non-feeding element 2 is slightly shorter than the resonance length, and the non-feeding element 2 is approximately one-fourth wavelength away from the feeding element 1. The non-feeding element 2 is capacitive, and a current is 90° ahead of a voltage. A 90° phase difference caused by a path difference between the feeding element 1 and the non-feeding element 2 and a phase difference caused because the non-feeding element 2 is capacitive are superposed to 180°, where the path difference is caused because the non-feeding element 2 points at a direction of the feeding element 1. Therefore, radiation fields of the non-feeding element 2 and the feeding element 1 in this direction are offset. Similarly, for an opposite direction, the 90° phase difference caused by the path difference between the feeding element 1 and the non-feeding element 2 and the phase difference caused because the non-feeding element 2 is capacitive are offset. Therefore, radiation fields of the non-feeding element 2 and the feeding element 1 in this direction are superposed. In this case, the non-feeding element 2 exerts a directing function on a beam, and is a director.

Figure 2:
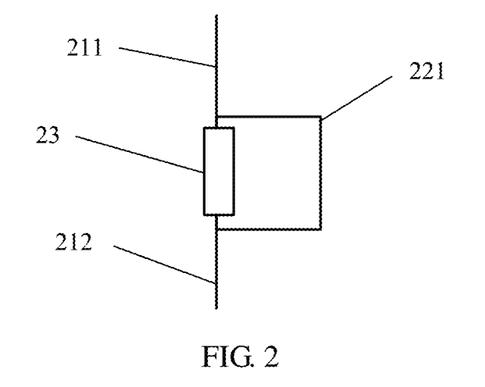
FIG. 2 is a schematic structural diagram of a regulator circuit according to this application.

When a current path length of the non-feeding element 2 is further regulated, regulation is performed using the regulator circuit 22. As shown in FIG. 1, the non-feeding element 2 disposed in this embodiment includes two parts, where one part is the first conductor 21 with a constant current path length, and the other part is the regulator circuit 22 with a constant current path length. The first conductor 21 includes two parts, which are respectively a first sub-conductor 211 and a second sub-conductor 212. Two ends of the control switch 23 are respectively connected to the first sub-conductor 211 and the second sub-conductor 212. As shown in FIG. 2, the first sub-conductor 211 and the second sub-conductor 212 are connected in a straight rod like structure. A structure that affects the current path length of the first conductor 21 lies in a length at which a current flows on the first conductor 21, and a shape of the first conductor 21 is not restricted. Therefore, the shape of the first conductor 21 is not restricted to the foregoing one shape, and may be any other shape, for example, different shapes such as a box shape, a spiral shape, or a wavy shape. Correspondingly, the first sub-conductor 211 and the second sub-conductor 212 may also use the foregoing shapes. In addition, the first sub-conductor 211 and the second sub-conductor 212 are connected using the control switch 23 that controls enablement of the regulator circuit 22. When the control switch 23 is turned off, the first sub-conductor 211 and the second sub-conductor 212 do not communicate directly. When the control switch 23 is turned on, the first sub-conductor 211 and the second sub-conductor 212 communicate directly.

Figure 3:
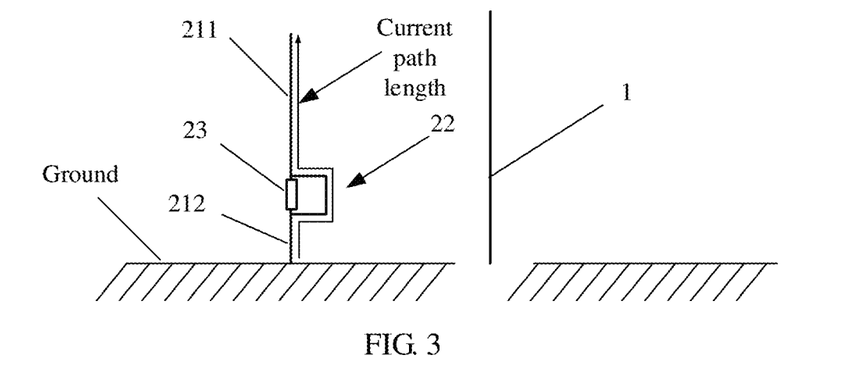
FIG. 3 is a conceptual diagram of a non-feeding element functioning as a reflector according to this application.
Figure 4:
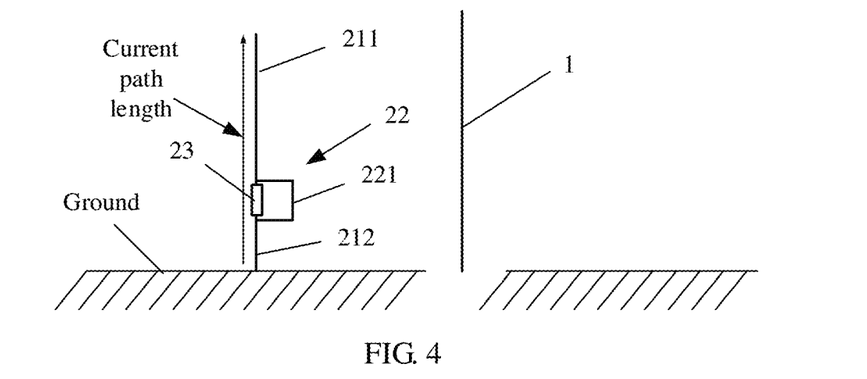
FIG. 4 is a conceptual diagram of a non-feeding element functioning as a director according to this application.

The regulator circuit 22 of the non-feeding element 2 includes at least one second conductor 221. Two ends of the second conductor 221 are respectively connected to the first sub-conductor 211 and the second sub-conductor 212. A current path length on the second conductor 221 is used to regulate a value of a current path length of the non-feeding element 2. As shown in FIG. 3, when the control switch 23 is turned off, the first sub-conductor 211 communicates with the second sub-conductor 212 through the regulator circuit 22. The straight line with an arrow in FIG. 3 illustrates a current path length. When the current path length of the second conductor 221 is added to the first conductor 21, the current path length of the non-feeding element 2 is a sum of the current path length of the first conductor 21 and the current path length of the second conductor 221. As shown in FIG. 4, the control switch 23 is turned on, and the first sub-conductor 211 communicates with the second sub-conductor 212 through the control switch 23. The straight line with an arrow in FIG. 4 illustrates a current path length. A current on the non-feeding element 2 flows through the control switch 23 and the first conductor 21. In this case, the current path length is a sum of the current path length of the first conductor 21 and a current path length on the control switch 23. Whether the second conductor 221 is added to the first conductor 21 is controlled by setting the control switch 23. When the control switch 23 is turned on, the regulator circuit 22 is disabled, the first sub-conductor 211 communicates with the second sub-conductor 212, and the current flows through the first sub-conductor 211 and the second sub-conductor 212. In this case, a current flowing through the second conductor 221 is very small and can almost be ignored. Therefore, the current path length of the non-feeding element 2 is a sum of the current path length of the first conductor 21 and a current path length on the control switch 23. When the control switch 23 is turned off, the regulator circuit 22 is enabled, and the first sub-conductor 211, the second conductor 221, and the second sub-conductor 212 communicate, and the current flows through the first sub-conductor 211, the second conductor 221, and the second sub-conductor 212. Therefore, the current path length of the non-feeding element 2 is the current path length of the first conductor 21 plus the current path length of the second conductor 221. In a specific use manner, the foregoing control switch 23 may be a PIN diode. Turn-on or turn-off of the control switch 23 is controlled using a communications device corresponding to the antenna. Further, the communications device analyzes, using an adaptive algorithm, a received signal that is transmitted by a terminal to obtain a location of the terminal, and controls a central processing unit (CPU) to send a control signal to turn on some pin diodes such that non-feeding elements 2 of this part are directors, and another non-feeding element 2 is a reflector. The antenna is switched to a directive antenna with a direction having greatest radiation pointing at the terminal.

It can be learned from the foregoing descriptions that the current path length of the non-feeding element 2 may be regulated using the current path length of the second conductor 221. Therefore, in design, only the current path length of the first conductor 21 and the current path length of the second conductor 221 need to be controlled such that the current path length of the first conductor 21 is less than λ/4 and the resonance length of the feeding element 1, and the current path length of the first conductor 21 plus the current path length of the second conductor 221 is greater than λ/4 and the resonance length of the feeding element 1. Therefore, the non-feeding element 2 may function as either a reflector or a director, and switching between two modes of the non-feeding element 2 is implemented by changing a working status of the control switch 23.

During specific setting, when the non-feeding element 2 functions as a director, the control switch 23 is then turned on, the current flows through the first conductor 21 and the control switch 23, and the current path length of the non-feeding element 2 is less than the resonance length of the feeding element 1. In a more specific implementation solution, the current path length of the non-feeding element 2 is less than $\lambda/4$ and is less than the resonance length of the feeding element 1, where $\lambda$ is the medium wavelength of the feeding element. For example, the current path length of the non-feeding element 2 falls within $0.21\lambda$-$0.24\lambda$. In this case, the current path length of the non-feeding element 2 is the current path length of the first conductor 21. That is, the current path length of the first conductor 21 is restricted within $0.21\lambda$-$0.24\lambda$. For example, the current path length of the first conductor 21 may be different, for example, $0.21\lambda$, $0.22\lambda$, $0.23\lambda$, or $0.24\lambda$. In this case, the current path length of the non-feeding element 2 is different, for example, $0.21\lambda$, $0.22\lambda$, $0.23\lambda$, or $0.24\lambda$.

In addition, when the non-feeding element 2 functions as a reflector, the current path length of the non-feeding element 2 is greater than the resonance length of the feeding element 1. That is, when the control switch 23 is turned off, the current flows through the first conductor 21 and the regulator circuit 22, the current path lengths of the first conductor 21 and the regulator circuit 22 are greater than the resonance length of the feeding element 1. In a more specific implementation solution, the current path length of the non-feeding element 2 is greater than $\lambda/4$ and is greater than the resonance length of the feeding element 1. For example, the current path length of the non-feeding element 2 falls within $0.26\lambda$-$0.28\lambda$. That is, when the regulator circuit 22 is enabled, the current path length of the non-feeding element 2 may be different, for example, $0.26\lambda$, $0.27\lambda$, or $0.28\lambda$. When the non-feeding element 2 functions as a reflector, the current path length of the non-feeding element 2 is a length of the current path length of the first conductor 21 plus a length of the current path length of the second conductor 221. Because the current path length of the first conductor 21 falls within $0.21\lambda$-$0.24\lambda$, the current path length of the second conductor 221 falls within $0.03\lambda$-$0.07\lambda$, for example, different current path lengths such as $0.03\lambda$, $0.04\lambda$, $0.05\lambda$, $0.06\lambda$, or $0.07\lambda$.

Figure 5:
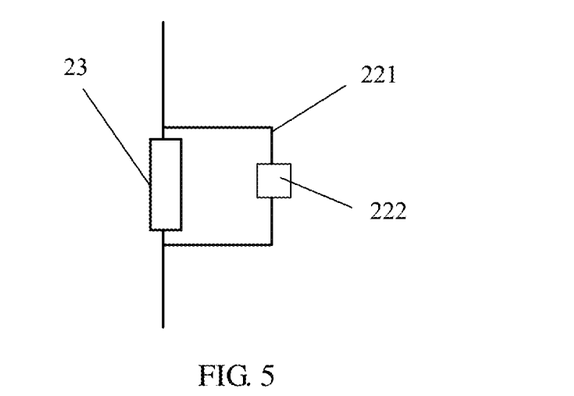
FIG. 5 is a schematic structural diagram of another regulator circuit according to this application.

It can be seen from FIG. 2 that the first conductor 21 uses two metal segments, and the two metal segments are respectively the first sub-conductor 211 and the second sub-conductor 212. The regulator circuit 22 uses the second conductor 221 to conduct electricity, and the second conductor 221 is also a segment of metal conductor. In this case, when the second conductor 221 is added to the first conductor 21, an increased current path length is a length of the second conductor 221. Moreover, a shape of the second conductor 221 is not restricted. Either a straight-line shape or an arc shape or another shape may be used. As shown in FIG. 2, the second conductor 221 is a U-shaped bending structure. The length of the second conductor 221 is the only factor that affects the current path length added to the first conductor 21. Certainly, the current path length of the regulator circuit 22 may further be restricted in another manner. As shown in FIG. 5, the regulator circuit 22 further includes a matched network 222. The matched network 222 is set on the second conductor 221 and is configured to change the current path length of the non-feeding element 2. In specific setting, the matched network 222 may be a capacitor, an inductor, or a capacitor and an inductor that are connected in series. For example, when a current flows through the inductor, it is equivalent that the current has passed through an extremely long path. Therefore, the current path length of the non-feeding element 2 may be changed using the disposed inductor.

When the second conductor 221 and the first conductor 21 are connected, the two ends of the second conductor 221 are respectively connected to the first sub-conductor 211 and the second sub-conductor 212. However, a location at which the second conductor 221 is connected to the first sub-conductor 211 and the second sub-conductor 212 directly affects the current path length of the entire non-feeding element 2. If the location at which the second conductor 221 and the first sub-conductor 211 are connected is at a distance from a location at which the first sub-conductor 211 and the control switch 23 are connected, this distance on the first sub-conductor 211 is not involved in current circulation when the control switch 23 is turned off. In this case, if a current path length is calculated according to a length of the first sub-conductor 211, an actual current path length of the non-feeding element 2 is less than the calculated current path length. Therefore, after the location at which the second conductor 221 is connected to the first sub-conductor 211 and the second sub-conductor 212 is determined, a part that is of the first conductor 21 and that is actually involved in the current path length is then determined. The length of the first sub-conductor 211 and a length of the second sub-conductor 212 are changed to compensate for impact caused by the location of connection of the second conductor 221. Alternatively, in specific setting, the two ends of the control switch 23 are separately provided with a connection point, one end of the first sub-conductor 211 and one end of the second conductor 221 are fastened to a connection point at one end of the control switch 23, and one end of the second sub-conductor 212 and the other end of the second conductor 221 are fastened to a connection point at the other end of the control switch 23. This facilitates connection of the second conductor 221. In addition, all parts of the first sub-conductor 211 and the second sub-conductor 212 are used as current path lengths, ensuring that a current path length through which the current passes may be equivalent to lengths of the first conductor 21 and the second conductor 221. In this case, an entire current path length may be directly restricted according to the lengths of the first conductor 21 and the second conductor 221.

Figure 6:
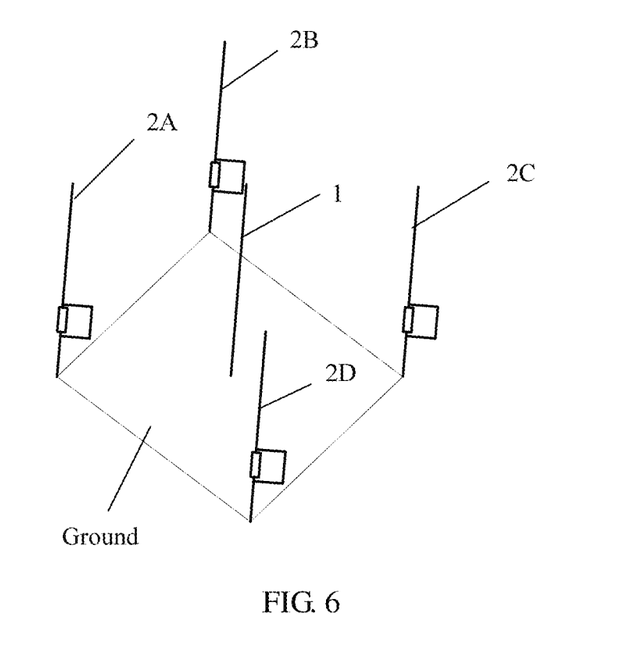
FIG. 6 is a schematic structural diagram of another antenna according to this application.

To facilitate understanding of the antenna provided in this embodiment, the following describes the antenna in detail using a specific embodiment. As shown in FIG. 6, a quantity of non-feeding elements 2 is four, and the four non-feeding elements 2 are arranged surrounding a feeding element 1. Different quantities of reflectors and directors are formed by enabling and disabling the regulator circuits 22 on the four non-feeding elements 2, thereby improving a directive gain and an interference suppression capability. In specific setting, the four non-feeding elements 2 form a ring shape and are evenly disposed.

Figure 7:
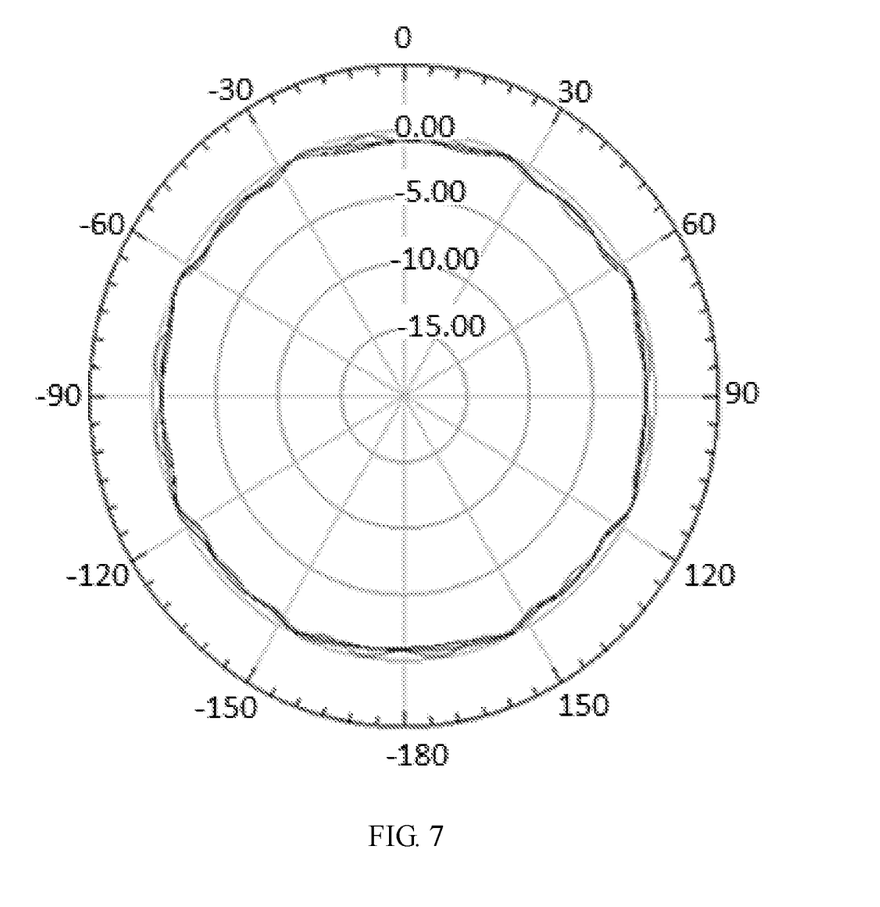
FIG. 7 is an omnidirectional simulation diagram of a structure of the antenna shown in FIG. 6.
Figure 8:
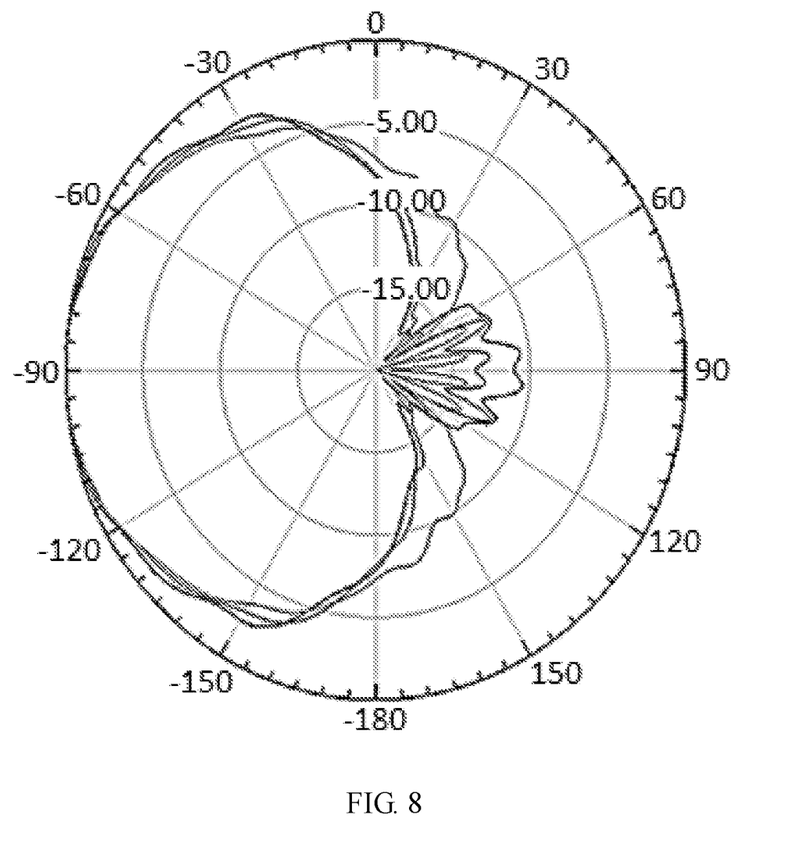
FIG. 8 is a directional simulation diagram of a structure of the antenna shown in FIG. 6.

Referring to FIG. 6, a feeding element 1 is in the middle, and there are four non-feeding elements (designated as 2A, 2B, 2C, and 2D) around a horizontal plane of the feeding element. Each non-feeding element uses the foregoing disclosure. When control switches 23 of all the non-feeding elements are turned on, an antenna obtained is an omnidirectional antenna. A directional diagram thereof is an omnidirectional diagram, and a simulation diagram thereof is shown in FIG. 7. When the control switch 23 of the non-feeding element 2A is turned on, and the control switches 23 of the non-feeding elements 2B, 2C, and 2D are turned off, the non-feeding element 2A functions as a director to guide a beam of the feeding element 1, and the non-feeding elements 2B, 2C, and 2D function as reflectors to reflect the beam of the feeding element 1. The director and the reflectors work simultaneously, thereby obtaining a directive beam with high directionality and back-lobe suppression. An antenna obtained in this case is a directive antenna, and a simulation diagram thereof is shown in FIG. 8. Therefore, directive beams of different orientations, that is, different directive antennas, may be obtained by selecting and connecting control switches 23 of different non-feeding elements, thereby implementing an adaptive smart antenna with a high gain.

Refer to FIG. 6 again. In FIG. 6, orientations of the regulator circuits of the non-feeding elements 2A, 2B, 2C, and 2D may be set arbitrarily, in order to reduce a spatial area occupied by the entire antenna. All the regulator circuits of the four non-feeding elements may be disposed to face a direction of the feeding element, thereby minimizing an area occupied by the antenna.

It can be learned from the foregoing descriptions that a design in which the reflectors and the director are compatible is used such that a combination of one feeding element, M directors and N reflectors is implemented to achieve a high directive gain and interference suppression capability, where M+N=quantity of non-feeding elements. In addition, in this application, antenna beam switching can be rapidly completed by turning on different pin diodes, featuring simple and rich antenna beam selection, and easy implementation and a small size of the antenna. In an n*n multiple-input multiple-output (MIMO) multi-antenna wireless communications system, each antenna includes m non-feeding elements. Therefore, the MIMO system has $2^{m*n}$ beam states, where m is a quantity of antennas, and n is a quantity of antennas. In specific use, a communications device analyzes, using an adaptive algorithm, a received signal that is transmitted by a terminal, to obtain a location of the terminal, and controls a CPU to send a control signal to turn on some pin diodes such that non-feeding elements 2 of this part are directors, and another non-feeding element 2 is a reflector. The antenna is switched to a directive antenna with a direction having greatest radiation pointing at the terminal.

In addition, this application further provides a communications device. The communications device includes the antenna according to any one of the foregoing implementations.

In the foregoing technical solutions, a current path length of a non-feeding element 2 and a distance between the non-feeding element 2 and a feeding element 1 are controlled such that the non-feeding element 2 forms a reflector when a regulator circuit 22 is enabled, or the non-feeding element 2 forms a director when the regulator circuit 22 is disabled. A design in which the reflector and the director are compatible is used such that a combination of one feeding element, M directors and N reflectors is implemented for the antenna (where M+N=quantity of non-feeding elements) to achieve a high directive gain and interference suppression capability. In addition, when the reflector and the director are switched, antenna beam switching can be rapidly completed, featuring easy implementation and a small size of the antenna.

Obviously, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. An antenna, comprising:
a feeding element; and
at least one non-feeding element coupled to the feeding element, wherein a distance between each of the at least one non-feeding element and the feeding element falls within a specified threshold, and wherein each of the at least one non-feeding element comprises:
a first conductor that is grounded;
a control switch coupled to the first conductor; and
a regulator circuit coupled to the first conductor and the control switch and configured to regulate a current path length of the at least one non-feeding element, wherein the regulator circuit regulates the current path length such that:
the current path length of the at least one non-feeding element is greater than a resonance length of the feeding element when the control switch is turned off, wherein a current is configured to flow through the first conductor and the regulator circuit when the control switch is turned off, and
the current path length of the at least one non-feeding element is less than the resonance length of the feeding element when the control switch is turned on, wherein the current is configured to flow through the first conductor and the control switch when the control switch is turned on.

2. The antenna of claim 1, wherein the first conductor comprises a first sub-conductor and a second sub-conductor, wherein two ends of the control switch are respectively coupled to the first sub-conductor and the second sub-conductor, wherein the regulator circuit comprises a second conductor, wherein two ends of the second conductor are respectively coupled to the first sub-conductor and the second sub-conductor, and wherein the first sub-conductor is configured to:
communicate with the second sub-conductor through the control switch when the control switch is turned on; and
communicate with the second sub-conductor through the second conductor when the control switch is turned off.

3. The antenna of claim 2, wherein one end of the first sub-conductor and one end of the second conductor are coupled to a coupling point at one end of the control switch, and wherein one end of the second sub-conductor and another end of the second conductor are coupled to a coupling point at another end of the control switch.

4. The antenna of claim 2, wherein the second conductor comprises a U-shaped bending structure.

5. The antenna of claim 1, wherein the specified threshold comprises 0.2λ-0.25λ, and wherein the λ comprises a medium wavelength of the feeding element.

6. The antenna of claim 1, wherein the current path length of the at least one non-feeding element is less than λ/4 and less than the resonance length of the feeding element when the control switch is turned on, and wherein the λ comprises a medium wavelength of the feeding element.

7. The antenna of claim 6, wherein the current path length of the at least one non-feeding element falls within 0.21λ-0.24λ when the regulator circuit is disabled.

8. The antenna of claim 1, wherein the at least one non-feeding element forms a director when the control switch is turned on and the regulator circuit is disabled.

9. The antenna of claim 8, wherein the at least one non-feeding element forms a reflector when the control switch is turned off and the regulator circuit is enabled.

10. The antenna of claim 1, wherein the current path length of the at least one non-feeding element is greater than $\lambda/4$ and greater than the resonance length of the feeding element when the control switch is turned on, and wherein the $\lambda$ comprises a medium wavelength of the feeding element.

11. The antenna of claim 10, wherein the current path length of the at least one non-feeding element falls within $0.26\lambda$-$0.28\lambda$ when the regulator circuit is enabled.

12. The antenna of claim 1, wherein a quantity of the at least one non-feeding element is four, and wherein the four non-feeding elements are arranged surrounding the feeding element.

13. The antenna of claim 12, wherein the four non-feeding elements are configured to form a ring shape, and wherein the four non-feeding elements are evenly disposed.

14. A communications device, comprising an antenna comprising:
 a feeding element; and
 at least one non-feeding element coupled to the feeding element, wherein a distance between each of the at least one non-feeding element and the feeding element falls within a specified threshold, and wherein each of the at least one non-feeding element comprises:
  a first conductor that is grounded;
  a control switch coupled to the first conductor; and
  a regulator circuit coupled to the first conductor and the control switch and configured to regulate a current path length of the at least one non-feeding element, wherein the regulator circuit regulates the current path length such that:
   the current path length of the at least one non-feeding element is greater than a resonance length of the feeding element when the control switch is turned off, wherein a current flows through the first conductor and the regulator circuit when the control switch is turned off, and
   the current path length of the at least one non-feeding element is less than the resonance length of the feeding element when the control switch is turned on, wherein the current flows through the first conductor and the control switch when the control switch is turned on.

15. The communications device of claim 14, wherein the first conductor comprises a first sub-conductor and a second sub-conductor, wherein two ends of the control switch are respectively coupled to the first sub-conductor and the second sub-conductor, wherein the regulator circuit comprises a second conductor, and wherein two ends of the second conductor are respectively coupled to the first sub-conductor and the second sub-conductor.

16. The communications device of claim 15, wherein one end of the first sub-conductor and one end of the second conductor are coupled to a coupling point at one end of the control switch, and wherein one end of the second sub-conductor and another end of the second conductor are coupled to a coupling point at another end of the control switch.

17. The communications device of claim 14, wherein when the control switch is turned on, the current path length of the at least one non-feeding element is less than $\lambda/4$ and less than the resonance length of the feeding element, and wherein the $\lambda$ comprises a medium wavelength of the feeding element.

18. The communications device of claim 17, wherein the at least one non-feeding element forms a director when the control switch is turned on and the regulator circuit is disabled.

19. The communications device of claim 14, wherein when the control switch is turned on, the current path length of the at least one non-feeding element is greater than $\lambda/4$ and greater than the resonance length of the feeding element, and wherein the $\lambda$ comprises a medium wavelength of the feeding element.

20. The communications device of claim 19, wherein the current path length of the at least one non-feeding element and the distance between the at the least one non-feeding element and the feeding element are controlled such that the at least one non-feeding element comprises a reflector when the control switch is turned off and the regulator circuit is enabled.

* * * * *